United States Patent Office 3,738,842
Patented June 12, 1973

3,738,842
PROCESS FOR PREPARING CURED SAUSAGES
Paul A. Hammes, Westfield, Charles W. Everson, Warren, and Wilson E. Danner, Linden, N.J., assignors to Merck & Co., Inc., Rahway, N.J.
No Drawing. Continuation-in-part of application Ser. No. 200,639, Nov. 30, 1971, which is a continuation-in-part of application Ser. No. 858,171, Sept. 15, 1969, now abandoned. This application Feb. 17, 1972, Ser. No. 227,244
Int. Cl. A22c *11/00;* A23b *1/02;* A23l *3/34*
U.S. Cl. 99—109                                      4 Claims

ABSTRACT OF THE DISCLOSURE

Glutamic acid, either alone or with other agents, is added into the sausage mixture as its acidity assists in the curing step without serving to break the sausage emulsion.

---

This application is a continuation-in-part of our copending patent application Ser. No. 200,639, filed Nov. 30, 1971 now abandoned, which in turn is a continuation-in-part of our patent application Ser. No. 858,171, filed Sept. 15, 1969, and expressly abandoned Feb. 11, 1972.

RELATED CASE

U.S. Ser. No. 52,718, filed July 6, 1970 now abandoned.

PRIOR ART

Patents 3,391,006; 3,391,007 and art cited therein.

This invention relates to a process for the production of cured sausage products and similar meat products made with animal red meat and particularly to an improvement in the curing step thereof. Also the invention includes compositions containing glutamic acid for use in this process.

The curing step is an essential one as it produces the desirable color, flavor and odor which are considered essential in cured meats. It involves the in situ formation in the sausage emulsion of nitric oxide by the chemical reduction of added edible nitrites and/or nitrites which are produced by microbial reduction of added nitrates. The nitric oxide is a decomposition product resulting from the reduction of the nitrites by the natural reductants of the meat and it is accelerated by the presence of enediol compounds such as ascorbic and erythorbic acids and their salts, or by other added reductants.

Although an acid condition is necessary for this reducing action to occur rapidly in the curing step, an excessively acid pH in the preceding emulsification step must be avoided because it may break the sausage emulsion. This is a necessary physical relationship in the initial sausage emulsification step as the emulsion must be one in which the protein is exterior of the fatty material. This emulsion is brought about by the comminuting and mixing operation within a known pH range. The addition of too much acidic agents during this emulsification operation with the thought in mind of having it present to accelerate the subsequent curing step will cause the emulsion to "short" or break. This results in the formation of pockets of fats which have an objectionable taste and appearance in the final sausage.

These conflicting requirements for a relatively non-acid environment during the emulsification step and the desirability of having an acid environment in the subsequent curing step are troublesome factors in modern sausage processing. The present day use of automated, continuous processes which obtain shorter manufacturing times for making sausage products has accentuated the need for acidic conditions in the curing step. To solve this problem it has been proposed to add glucono-delta-lactone (GDL) in the emulsifying step. The GDL is neutral but in the meat it hydrolyzes slowly to form gluconic acid. Fumaric acid and sodium acid pyrophosphate (SAP) also have been proposed but they have not had wide acceptance.

The general use of GDL has met with some resistance because the resulting gluconic acid may have an unpleasant or "foreign" taste or it may form too soon and break the emulsion. This latter may occur because the hydrolysis of GDL to gluconic acid continues slowly at low temperatures, the rate is increased with increasing temperature and if the manufacturing process is delayed sufficiently at any point the emulsion may break and phase separation will occur.

In accordance with the present invention, it has been found that glutamic acid and preferably its L-isomer can be added into the sausage mixture at the comminuting or mixing step without interfering with the necessary emulsification and without tending to break the emulsion in the succeeding steps. These results are achieved because the glutamic acid is but very slightly soluble in the emulsion at the low temperature, generally about 10° to 20° C., at which the sausage emulsion is prepared and it therefore contributes negligible acidity at this stage, that is, the meat mixture will be within the pH range of 5.8 to 6.0. The glutamic acid is, however, highly soluble at the temperature, generally from about 65° to 75° C., at which the sausage is customarily heat processed and it therefore produces the acidic environment within the pH range of 5.3 to 5.5 which accelerates the liberation of nitric oxide in this step. The glutamic acid, therefore greatly accelerates the development of cure color and makes possible the complete processing of sausage products at higher temperatures in shorter periods of time. Moreover, the glutamic acid, as such, does not have an unpleasant taste.

As an actual fact, the use of glutamic acid has the added feature that much of it seems to be converted in the sausage mixture to a salt form and this imparts its flavor enhancing effect to the product much like that of monosodium glutamate (MSG). The taste of the final product indicates that this conversion to an agreeable tasting salt occurs although its exact nature is not known but a possible explanation is a chemical interaction with the amino groups of the proteins in the meat. The addition of MSG directly in the emulsifying step to impart its taste to the final sausage will not, due to its neutrality, serve to produce the acidity necessary for the curing step.

The invention takes advantage of the little known fact that glutamic acid is only slightly soluble in 0° C. water but is quite soluble in 100° C. water. Most chemical dictionaries make no mention of the greatly increasing solubility of glutamic acid in water as its temperature is increased. The striking temperature-related solubility is set forth in the data on page C-669 of the Handbook of Chemistry and Physics published by the Chemical Rubber Co. From the figures given there the following data may be interpolated with respect to the temperatures involved in this invention and the solubility in grams per 100 grams of water.

| Degrees Centigrade | 10 | 20 | 65 | 75 |
|---|---|---|---|---|
| L-glutamic acid | 0.45 | 0.75 | 4.00 | 5.53 |
| DL-glutamic acid | 1.00 | 1.75 | 9.25 | 11.86 |

L-glutamic acid is the agent of choice because it is very slightly cold water soluble and this is the only isomer that contributes an MSG-like effect in the final sausage product. However, the racemic DL mixture may be used and may be preferred under certain conditions. If a DL mixture is used, a sufficient amount should be measured out to supply from 50% to 100% of the amount of the L form which is hereinafter called for.

In practicing the invention, the glutamic acid is substituted for all or a part of GDL, fumaric acid or sodium acid pyrophosphate (SAP) on a weight basis. In fact, less of the glutamic acid, as a percentage of the sausage mixture, can be added than if GDL or other acidifying agent is used, because the former is more acidic. By glutamic acid is meant either the free acid or a derivative such as its physiological and pharmaceutically acceptable forms such as the hydrochloride. A preferred total amount of L-glutamic acid is 6 ounces per 100 pounds of the sausage mix if it alone is used, but from 2 to 8 ounces may be added. At the upper levels the DL-mixture may be used as that quantity will furnish an adequate level of L-glutamic acid. Or as stated above, it may only partially replace GDL or another acidic agent such as fumaric acid or sodium acid pyrophosphate.

By the term sausage as used herein is meant the meats usually, but not necessarily, stuffed in a casing to form a single generally cylindrical unit or a series of them linked together and which are then heat cured. They are referred to as cooked, cured sausages and they are different from so called fresh sausage such as fresh pork sausages or the dry and semi-dry sausages such as pepperoni and thuringer which may not need to be heat cured. By "red meats" as herein used, is intended any animal flesh and fat as distinct from fish flesh and fat. The animal source may be bovine, pig, lamb, or fowl and an important difference here is that this red animal meat will remain as an emulsion, under the processing conditions whereas a fish meat emulsion is subject to breakage.

Representative examples are the following:

EXAMPLE 1

A frankfurter is made of the following compositions:

| | |
|---|---|
| Beef chucks _____lbs__ | 50 |
| Beef plates _____lbs__ | 50 |
| Water or ice _____lbs__ | 25 |
| Sodium chloride _____lbs__ | 2.5 |
| Sodium nitrite _____oz__ | 0.25 |
| Commercial frankfurter spice _____lb__ | 1 |
| Sodium erythorbate _____oz__ | 0.87 |
| L-glutamic acid (or its HCl salt) _____oz__ | 6 |

The initial step involves chopping the lean meat, sodium chloride, sodium nitrite and at least a portion of the water or ice in the cutter until the particle size is reduced and at least a portion of the salt-soluble protein is extratced. The rest of the meat formulation, the spices and the balance of the water or ice, if any, is then added and the chopping continued. Shortly before the end of the chopping cycle, the sodium erythorbate and glutamic acid, separately or in combination or admixture are added and thoroughly mixed through the emulsion. During this entire first stage the temperature of the meat mixture will be within a 10° to 20° C. range and the pH of the meat will be 5.8 to 6.0.

The emulsion is stuffed into suitable casings, transferred to a smoke house, and subjected to heat, which may raise the internal temperature to 65° to 75° C. but it may be up to a higher temperature, say up to 85° C., to cure and cook the sausage. At this elevated temperature the glutamic acid goes into solution so that the meat is at a pH 5.3 to 5.5. Smoke is usually applied to impart the typical flavor to the product. Heat processing times varied from 15–35 minutes. The shorter than usual curing time is made possible by the possible use of a higher curing temperature and it will be found that a complete cure is effected and that the frankfurter is of excellent quality and taste.

Following the heat process, the frankfurters are cold showered and placed in the 35–40° F. cooler to chill before being packaged.

EXAMPLE 2

Example 1 is carried out but for the meat is substituted:

| | Lbs. |
|---|---|
| Beef trimmings _____ | 60 |
| Regular pork trimmings _____ | 40 |

EXAMPLE 3

Example 1 is carried out but for the meat is substituted:

| | Lbs. |
|---|---|
| Beef chucks _____ | 40 |
| Lean pork trimmings _____ | 40 |
| Pork fat back _____ | 20 |

EXAMPLE 4

Example 1 is carried out but for the meat is substituted:

| | Lbs. |
|---|---|
| Beef chucks _____ | 50 |
| Regular pork trimmings _____ | 50 |

EXAMPLE 5

Example 1 is carried out but for the meat is substituted:

| | Lbs. |
|---|---|
| Beef chucks _____ | 30 |
| Veal trimmings _____ | 20 |
| Regular pork trimmings _____ | 50 |

EXAMPLE 6

Example 1 is carried out but for the meat is substituted:

| | Lbs. |
|---|---|
| Beef trimmings _____ | 40 |
| Mutton _____ | 10 |
| Regular pork trimmings _____ | 50 |

EXAMPLE 7

Example 1 is carried out but for the meat is substituted:

| | Lbs. |
|---|---|
| Beef chucks _____ | 40 |
| Boneless chicken meat _____ | 15 |
| Regular pork trimmings _____ | 45 |

EXAMPLE 8

A bologna was made by using the separate compositions and processes of Examples 1 to 7 with the change therefrom that the heat processing step of each varied from 2 to 4 hours.

EXAMPLE 9

The processes of any one of the above examples is carried out with the variation that the amount of L-glutamic acid is as low as two ounces per 100 pounds of meat up to as high as eight ounces. If racemic glutamic acid is used, enough would be measured out to supply L-glutamic acid within this range.

Other variations contemplated by the invention involve such factors as patatable changes in the sodium chloride, erythorbate, spices or other flavoring content, nitrate or commonly added agents as nitrates or ascorbates.

EXAMPLE 10

As stated above the invention contemplates a composition or mixture of glutamic acid and one or more of the following ingredients which are commonly added to sausage mixtures:

In order to separate said drops to prevent them from

| Ingredient: | Percent w./w. of L-glutamic acid |
|---|---|
| Sodium erythorbate (ascorbate, and acids) | 2–100 |
| Sodium or potassium nitrate | 1–15 |
| Sodium or potassium nitrate | 0–30 |
| Spices (including sugar) | 100–1600 |
| Sodium chloride | 200–2400 |
| Flavor potentiators and enhancers | 0–800 |
| Other functional additives such as: food phosphates, chelating agents, binders such as soy bean flour, wheat flour, milk powder, etc. Antioxidants such as pheolic compounds | 0–4000 |

A composition made up by mixing L-glutamic acid (or a sufficiently larger amount of the DL form) with one or more or all of the agents in this list would be sold for use in the curing process. The one or more agents missing from this mixture would be added at the emulsifying step to suit individual preferences.

For instances, within the scope of Example 10 the invention contemplates a marketable mixture of L-glutamic acid and 25% by weight of sodium erythorbate, but the relative amount of the erythorbate may be within the stated range. To it may be added say 5% of sodium nitrate or the mixture may be only of glutamic acid and sodium nitrite within the range stated. The large range for the flavoring agent is due to the variation in the strength of the various flavoring agents, as is well known in the art. In the case of the other functional additives, the large range is also due to the known variations in the needed amounts. For instances, a chelating agent would constitute only a few percent by weight of the L-glutamic acid whereas milk powder, if selected for the mixture, could amount to up to 40 times the weight of the L-glutamic acid.

The composition to be sold as a commercial product may contain only the most essential ingredients, namely, the L-glutamic acid (or DL-glutamic acid), the ascorbate or erythorbate (or an equivalent enediol compound), the nitrate, the spices and sodium chloride, all within the ranges in Example 10. The other ingredients in Example 10 with as low as a zero (0) amount may be added, if desired, by the sausage manufacturer.

The sodium salts in Examples 1 and 10 may be replaced by the corresponding potassium salts or other edible alkali metal salts or alkali earth metal salts as they are functionally equivalent in sausage manufacture. Also, as stated above, the L-glutamic acid may replace only a portion of the acidifying agents commonly used, such as GDL, fumaric acid and SAP. In Example 9 for instance, if the lower amount, say 2 to 4 ounces of L-glutamic acid is used, there may also be present a smaller amount of GDL, fumaric acid or SAP than is usually used in commercial production.

What is claimed is:

1. The process for making cured sausages of animal meats which comprises first making a sausage emulsion by mixing together chopped red meat selected from the group consisting of beef, pork, lamb, or fowl, an edible nitrite, an enediol reducing agent, and L-glutamic acid amounting to 2 to 8 ounces per 100 pounds of meat, the sausage emulsion being maintained at 10° to 20° C. so that a minimal amount of the glutamic acid goes in solution and the pH of the sausage emulsion is in a 5.8 to 6.0 range, stuffing the sausage emulsion into suitable casings, then curing the stuffed sausage emulsion by heating it until the internal temperature reaches 65° to 85° C. during which period the L-glutamic acid, because of its increased solubility at high temperatures, goes into solution and reduces the pH of the sausage to a 5.3 to 5.5 range and thereby accelerates the curing of the sausage.

2. The process according to claim 1 in which approximately 6 ounces of glutamic acid is added to 100 pounds of the meat.

3. The process according to claim 1 in which said enediol reducing agent is selected from the alkali metal salts of ascorbic acid and erythorbic acid.

4. The process according to claim 1 in which there is also added to the emulsion a reducing agent selected from glucono-delta-lactone, fumaric acid, and sodium acid pyrophosphate.

References Cited
UNITED STATES PATENTS

| 2,687,356 | 8/1954 | Fraticelli | 99—159 X |
| 3,391,006 | 7/1968 | Sair et al. | 99—159 |
| 3,493,396 | 2/1970 | Nakayama et al. | 99—109 X |

HYMAN LORD, Primary Examiner

U.S. Cl. X.R.

99—159, 222